J. E. DIAMOND.
COMPOSITE PISTON.
APPLICATION FILED SEPT. 1, 1916.

1,357,851.

Patented Nov. 2, 1920.
2 SHEETS—SHEET 1.

Inventor:
James E. Diamond
by Edward R. Alexander
his Attorney

J. E. DIAMOND.
COMPOSITE PISTON.
APPLICATION FILED SEPT. 1, 1916.

1,357,851.

Patented Nov. 2, 1920.

UNITED STATES PATENT OFFICE.

JAMES E. DIAMOND, OF EAST CLEVELAND, OHIO, ASSIGNOR TO THE ALUMINUM CASTINGS COMPANY, OF CLEVELAND, OHIO, A CORPORATION OF OHIO.

COMPOSITE PISTON.

1,357,851.  Specification of Letters Patent.  Patented Nov. 2, 1920.

Application filed September 1, 1916. Serial No. 117,984.

*To all whom it may concern:*

Be it known that I, JAMES E. DIAMOND, a citizen of the United States, residing at East Cleveland, in the county of Cuyahoga and State of Ohio, have invented certain new and useful Improvements in and Relating to Composite Pistons, of which the following is a specification.

This invention relates to composite pistons for use particularly in internal combustion motors.

One of the objects of my invention is to produce a simple, light, durable and efficient composite, skirted piston peculiarly adapted to meet the conditions which exist within an internal combustion motor cylinder, including the stresses and strains imposed upon the piston, principally during the explosion stroke, and by the high heat generated at this time, which must be (*a*) efficiently and economically utilized in the transformation of heat into mechanical energy and (*b*) that not transformed into mechanical energy properly dissipated.

My present invention also contemplates an improvement in pistons of the general character disclosed in Letters Patent 1,296,589 to Joseph H. Bamberg.

Purely for the purposes of disclosure herein I have selected to illustrate and describe one construction of an internal combustion motor with a skirted piston embodying my improvements.

In the drawings, Figure 1 is a side elevation of a piston embodying my improvements.

Figure 1:
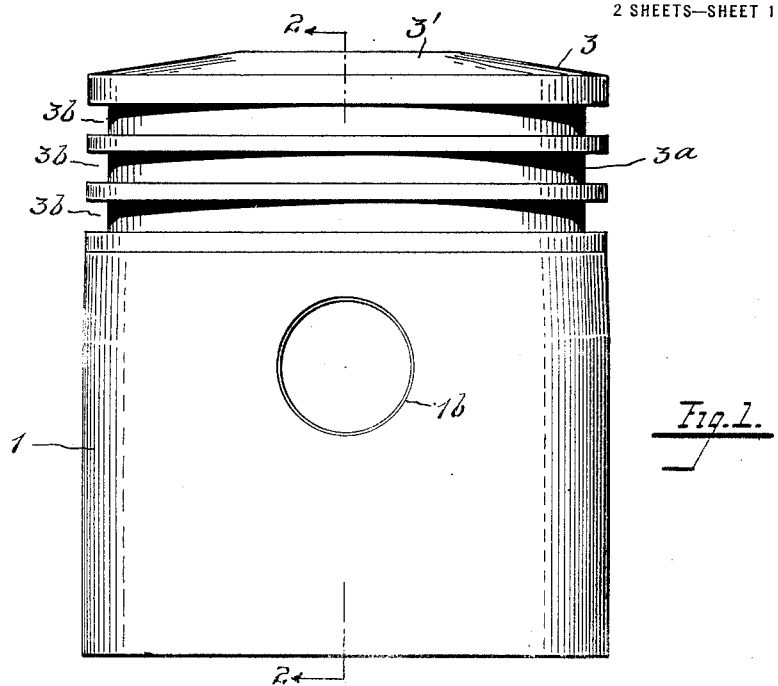
Figure 2:
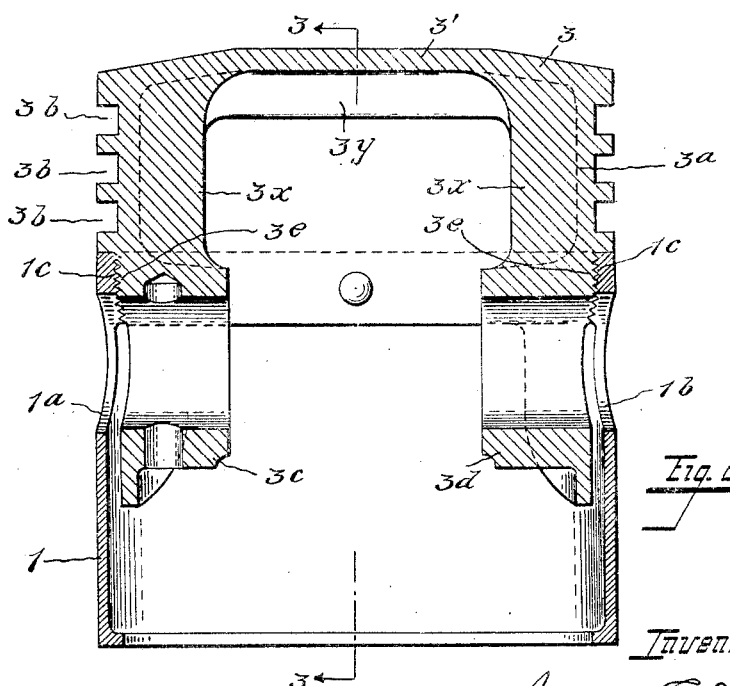
Fig. 2 is a section on the line 2—2, Fig. 1.
Figure 3:
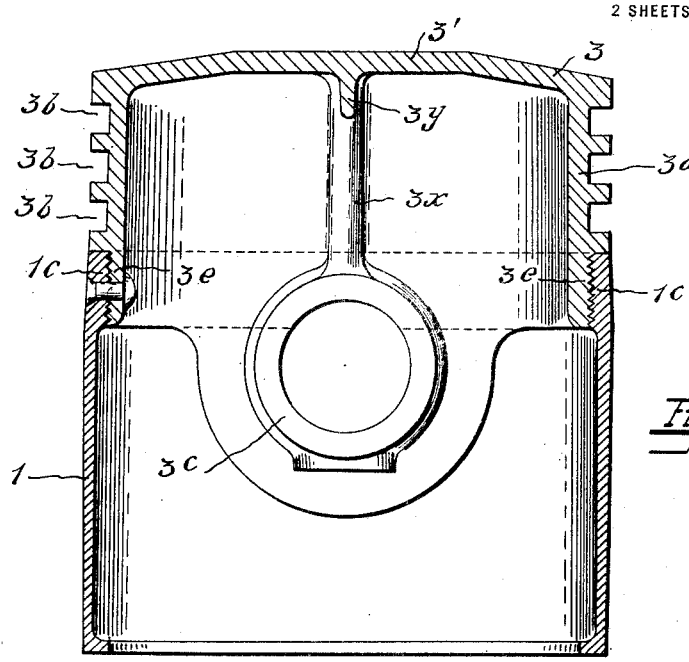
Fig. 3 is a section on the line 3—3, Fig. 2.
Figure 4:
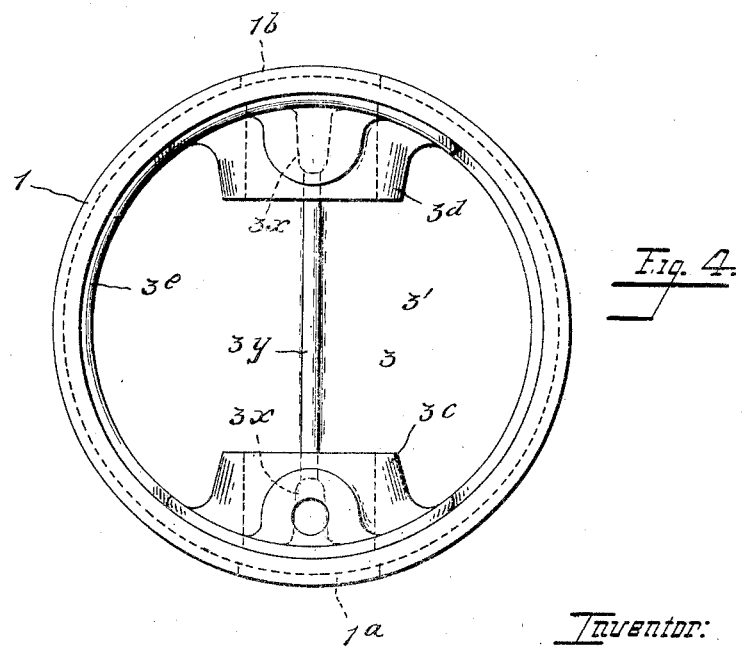
Fig. 4 is a bottom or lower plan view.

1 is the skirt, body or guide portion of the piston, which may be made of cast iron, a section of steel tubing, or any other suitable wear resisting material. It is formed with diametrically opposed apertures through it, $1^a$, $1^b$, concentric with the axis of the wrist pin bosses, to permit the insertion and withdrawal of the wrist pin as desired and the circulation of lubricant. At its upper end it is preferably formed with an internal boss $1^c$, preferably screw-threaded.

3 indicates the head or top wall and connecting parts of the piston. It comprises, preferably, an end wall $3'$, an annular outer wall $3^a$ preferably suitably grooved, as indicated at $3^b$, to receive suitable piston rings and inwardly extending wrist pin bosses $3^c$, $3^d$. Inwardly extending walls or ribs $3^x$ also may be provided, if desired. The portions $3'$, $3^a$, $3^c$, $3^d$ and $3^x$ of the piston may be cast of a metallic alloy having relatively low specific gravity. Their principal functions are to assist in translating the heat of the burning gases in the motor cylinder into mechanical energy, dissipate a part of that heat, principally by conduction and radiation, and to carry the piston rings in such manner that they will co-act properly with the inner walls of the cylinder with which they are adapted to contact.

The skirt 1 at its upper end, and preferably above the wrist pin bearings in the wrist pin bosses, is properly related to and connected with the head 3. Preferably this is accomplished by forming above said bearings in the wrist pin bosses a cylindrical, externally screw-threaded portion $3^e$, to which is fitted, in the well known manner, the internally screw-threaded boss $1^c$ of the guide section 1. This connection and fit may be advantageously made by heating the upper end of the guide section 1 so as to expand the same and making a tight, screw-threaded fit with the portion $3^e$ when thus expanded, so that upon cooling a substantial shrink fit between the parts will be obtained.

Preferably I cast the end wall $3'$, side wall $3^a$, including section $3^e$, bosses $3^c$, $3^d$ and webs $3^x$ integrally and of an aluminum alloy, the principal component of which is the metal aluminum. I now prefer to make the head and connecting parts of the piston in accordance with the improved process of said Joseph H. Bamberg set forth and described in his aforesaid Letters Patent, whereby the resulting product is relatively fine grained and dense in structure and of sufficient tensile strength to withstand all ordinary conditions of usage within the cylinder of an internal combustion motor.

For strengthening and heat dissipating purposes, among others, a depending web or rib $3^y$ may be cast integrally with the end wall $3'$.

It will be understood that the sleeve or skirt 1 may be constructed so as snugly to fit the inner walls of the motor cylinder, whereas the head 3 may be given a considerable amount of clearance between its outer wall $3^a$ and the inner wall of the cylinder, to allow for all necessary expansion of the head due to the high temperatures to which it is subjected. The heat transmitted to the head which is not translated into mechanical energy is transferred downwardly by the side walls 3ª, webs 3ˣ, wrist pin bosses 3ᶜ, 3ᵈ and webs 3ʸ, and much of it is dissipated by radiation, so that the skirt is kept relatively cool and may be readily lubricated to provide and maintain the proper working relationship between it and the inner wall of the motor cylinder. The fit between the skirt and the inner wall of the cylinder, as before indicated, may be a snug sliding fit, and the area of the skirt which co-acts with the inner wall of the motor cylinder is such as to insure against slapping or rapping of the piston against the inner wall of the cylinder. In fact the objectionable so-called piston slap, incident to the operation of numerous types of pistons for use in internal combustion motors, is eliminated by the use of a piston constructed in accordance with my invention. Furthermore, a piston embodying my improvements herein described practically eliminates so-called "oil pumping" or transfer of an undue amount of oil or lubricant from the crank case to the upper end of the piston, resulting in undesirable smoking and undue and troublesome carbonization, among other things.

The joint between the upper end of the skirt 1 and the casting 3, at the cylindrical section 3ᵉ, operates as a relatively poor conductor of heat as compared with the metal of the casting 3, so that to a large extent the heat which must be dissipated by the side walls 3ª is radiated largely by the side walls, bosses 3ᶜ, 3ᵈ and webs 3ˣ and 3ʸ rather than transferred across the said joint to the guide section 1. In view of the fact that it is possible that the upper end of the skirt 1ᵉ may be heated to a somewhat higher degree than the remainder thereof, and in order to avoid all possibility of scoring at this point, the guide section may be slightly tapered toward its upper end, as shown in the drawings, just the necessary reduction in diameter being obtained by the taper to allow for increased expansion of the upper part of the guide section as compared with the remainder thereof.

It is obvious that a piston made in accordance with my invention can be made relatively light in weight so as to largely reduce the weight of the reciprocating parts of the engine; and at the same time, as has been pointed out, my improved construction eliminates piston slap, oil pumping and scoring of the engine cylinder. It is to be observed that these advantages flow from the composite structure of my improved piston and especially from a suitable choice of materials for the head and guide parts, respectively; the aluminum head insures light weight, while the wear-resisting guide section, especially if it be made of iron provides suitable wearing qualities and, by reason of its relatively low coefficient of thermal expansion, makes possible the snug fit of the piston in the engine cylinder, this latter result being furthered in a measure by the poor heat conductivity of the joint between the head and guide sections of the piston.

Pistons of my improved construction will be found to operate comparatively noiselessly, smoothly and efficiently.

Where the cast portion of my composite piston above described, is made in accordance with said invention of Joseph H. Bamberg, set forth and described in his aforesaid Letters Patent, the casting will be suitably chilled so that the structure will be relatively fine grained and non-porous and the eutectic will substantially surround the excess substance in the structure.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A composite piston for an internal combustion motor having a head and wrist pin bearing bosses cast integrally of metallic alloy having a relatively low specific gravity in comparison with iron, the head having its side wall formed with grooves to receive packing rings, and a tubular guide section of wear resisting material into which said wrist pin bosses extend and which provides wearing surfaces for engagement with the inner walls of a motor cylinder at points above and below the wrist pin bearings in said bosses, the upper end of said guide section being secured to said head by a connection which is a relatively poor conductor of heat.

2. A composite piston for an internal combustion motor having a head and wrist pin bearing bosses cast integrally of metallic alloy having a relatively low specific gravity in comparison with iron, and a tubular, integral guide section of wear resisting material into which said wrist pin bosses extend and which provides wearing surfaces for engagement with the inner walls of a motor cylinder at points above and below the wrist pin bearings in said bosses, the upper end of said guide section being secured to said casting above the wrist pin bearings in said bosses, and said guide section tapering toward its upper end.

3. A composite piston for an internal combustion motor having a head and wrist pin bearing bosses cast integrally of aluminum alloy having a relatively low specific gravity in comparison with iron, the head having its side wall formed with grooves to receive packing rings, and a tubular, integral guide section of iron into which said wrist pin bosses extend and which provides wearing surfaces for engagement with the inner walls of a motor cylinder at points above and below the wrist pin bearings in said bosses, said guide section being relatively long compared with the diameter of the wrist pin bearings in said wrist pin bosses and extending above and below said bearings so as always to co-act with the inner walls of a motor cylinder both above and below said wrist pin bearings and there being a connection between the upper end of said guide section and the head which is a relatively poor conductor of heat.

4. A composite piston for an internal combustion motor having a head and wrist pin bearing bosses cast integrally of metallic alloy having a relatively low specific gravity and a high coefficient of thermal expansion in comparison with iron, and a tubular iron guide section into which said wrist pin bosses extend and which provides wearing surfaces for engagement with the inner walls of a motor cylinder at points above and below the wrist pin bearings in said bosses, the upper end of said guide section being secured to said casting above the wrist pin bearings in said bosses by a connection which is a relatively poor conductor of heat and said guide section tapering toward its upper end.

5. A composite piston for an internal combustion motor having a head and wrist pin bearing bosses cast integrally of metallic alloy having a relatively low specific gravity and a high coefficient of thermal expansion in comparison with iron, and a tubular guide section surrounding said wrist pin bosses and having its upper end secured to the said casting above the wrist pin bearings in said bosses, said guide section being tapered toward its upper end and being formed of wear-resisting metal with a relatively low coefficient of thermal expansion and providing wearing surfaces for engagement with the inner walls of a motor cylinder at points above and below the wrist pin bearings.

In testimony whereof I affix my signature.

JAMES E. DIAMOND.

Witness:
   Geo. B. Pitts.